United States Patent
Shao et al.

(10) Patent No.: US 8,289,836 B2
(45) Date of Patent: *Oct. 16, 2012

(54) APPARATUS AND ASSOCIATED METHODS TO INTRODUCE DIVERSITY IN A MULTICARRIER COMMUNICATION CHANNEL

(75) Inventors: Lei Shao, Seattle, WA (US); Sumit Roy, Seattle, WA (US); Sumeet Sandhu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 981 days.

This patent is subject to a terminal disclaimer.

(21) Appl. No.: 10/788,657

(22) Filed: Feb. 27, 2004

(65) Prior Publication Data

US 2004/0257978 A1    Dec. 23, 2004

Related U.S. Application Data

(60) Provisional application No. 60/451,110, filed on Feb. 27, 2003.

(51) Int. Cl.
*H04J 11/00* (2006.01)

(52) U.S. Cl. .................................... 370/208; 375/299

(58) Field of Classification Search .................. None
See application file for complete search history.

(56) References Cited

U.S. PATENT DOCUMENTS

| | | | | |
|---|---|---|---|---|
| 5,559,561 | A * | 9/1996 | Wei | 348/470 |
| 6,473,467 | B1 * | 10/2002 | Wallace et al. | 375/267 |
| 6,801,788 | B1 * | 10/2004 | Csapo et al. | 455/561 |
| 6,865,237 | B1 * | 3/2005 | Boariu et al. | 375/295 |
| 7,002,900 | B2 * | 2/2006 | Walton et al. | 370/208 |
| 7,010,053 | B2 | 3/2006 | El-Gamal et al. | |
| 7,177,365 | B2 * | 2/2007 | El-Gamal et al. | 375/267 |
| 7,224,744 | B2 * | 5/2007 | Giannakis et al. | 375/267 |
| 2004/0081074 | A1 * | 4/2004 | Piechocki | 370/206 |
| 2004/0081263 | A1 * | 4/2004 | Lee et al. | 375/347 |
| 2004/0114506 | A1 * | 6/2004 | Chang et al. | 370/208 |
| 2004/0120416 | A1 * | 6/2004 | Pauli et al. | 375/267 |
| 2005/0078761 | A1 * | 4/2005 | Hottinen et al. | 375/267 |

FOREIGN PATENT DOCUMENTS

| WO | WO 03/081857 | 10/2003 |
|---|---|---|
| WO | WO 2004/077734 | 9/2004 |

OTHER PUBLICATIONS

Gowrisankar, A Rate-one Full-diversity Low-complexity Space-Time-Frequency Block Code (STFBC) for 4-Tx MIMO-OFDM, 2005, vol. 2, pp. 2090-2094.*

Lei Shao, et al., "Rate-one Space Frequency Block Codes with Maximum Diversity Gain for MIMO-OFDM", IEEE Global Telecommunications Conference Globecom 2003, Dec. 1, 2003, pp. 809-813, vol. 2.

(Continued)

*Primary Examiner* — Nittaya Juntima
*Assistant Examiner* — Rhonda Murphy
(74) *Attorney, Agent, or Firm* — Blakely, Sokoloff, Taylor & Zafman LLP

(57) ABSTRACT

An apparatus and associated methods to improve diversity gain while preserving channel throughput in a multicarrier communication channel are generally presented.

19 Claims, 5 Drawing Sheets

OTHER PUBLICATIONS

King F. Lee, et al., "A Space-Frequency Transmitter Diversity Technique for OFDM Systems", Globecomm 2000, IEEE Global Telecommunications Conference, Nov. 27, 2000, pp. 1473-1477, vol. 3, San Francisco, CA USA.

Li Lihua, "A Practical Space-Frequency Block Coded OFDM Scheme for Fast Fading Broadband Channels", IEEE International symposium on personal indoor and mobile radio communications, PIMRC, Sep. 15, 2002, pp. 212-216, vol. 1, Sections II, IV.

Maxime Guillaud, et al., "Full-Rate Full-Diversity Space-Frequency Coding for MIMI OFDM Systems" Proceedings of the 3rd Benelux Signal Processing Symposium, Mar. 21, 2002, pp. S02-1-S02-4, Section 2, Leuven, Belgium.

Helmut Bolcskei, et al., "Space-Frequency Coded Broadband OFDM Systems" 2000 IEEE Wireless Communications and Networking Conference, Sep. 23, 2000, pp. 1-6, vol. 1.

Final Office Action for U.S. Appl. No. 10/789,387, mailed Sep. 20, 2007, 6 pgs.

Office Action for U.S. Appl. No. 10/789,387, mailed Apr. 20, 2007, 14 pgs.

Office Action for U.S. Appl. No. 10/789,387, mailed Mar. 17, 2008, 5 pgs.

Tirkkonen, Olav et al., "Minimal Non-Orthogonality Rate 1 Space-Time Block Code for 3+ Tx Antennas", Spread Spectrum Techniques and Applications, 2000 IEEE Sixth International Symposium on, Publication Date: 2000, vol. 2, pp. 429-432.

Office Action for China Patent Application No. 20048005282.9, mailed May 28, 2008, 25 pgs.

Office Action for U.S. Appl. No.10/789,387, mailed Sep. 4, 2008, 8 pgs.

Office Action for Taiwan Patent Application No. 94104653, mailed May 16, 2008.

Translation of Office Action for Korean Patent Application No. 2005-7015839, mailed Dec. 12, 2008, 2 pgs.

Translation of Office Action for Japanese Patent Application No. 2005-518591, mailed Feb. 29, 2008, 7 pgs.

Office Action for Malaysian Patent Application No. PI 20050794, mailed Jun. 13, 2008, 7 pgs.

Office Action for U.S. Appl. No. 10/789,387, mailed Dec. 30, 2008, 6 pgs.

Office Action for Malaysian Patent Application No. PI 20050652, mailed Oct. 14, 2008, 10 pgs.

Final Office Action for U.S. Appl. No. 10/789,387, mailed May 13, 2009, 11 pgs.

Office Action for U.S. Appl. No. 10/789,387, mailed Nov. 10, 2009, 11 pgs.

Office Action for Chinese Patent Application No. 20058000623.5, mailed Apr. 17, 2009, 10 pgs.

Office Action for Application No. CN200580006236.5, dated Mar. 24, 2010, 14 pgs.

Office Action for Application No. 200480005282.9, dated May 28, 2008, 25 pgs.

Office Action for Application No. 200480005282.9, dated Dec. 18, 2009, 18 pgs.

Office Action for Application No. 05736547.0, dated Mar. 5, 2010, 5 pgs.

Office Action for Application No. 200480005282.9, dated Sep. 29, 2011, 13 pages.

Office Action for Application No. PI 20050794, dated Nov. 30, 2011, 3 pages.

International Search Report for Application No. PCTUS2005004478, mailed Apr. 8, 2005, 5 pages.

Written Opinion for Application No. PCTUS2005004478, mailed Aug. 2, 2005, 4 pages.

International Preliminary Report on Patentability for Application No. PCTUS2005004478, mailed Aug. 30, 2006, 5 pages.

International Search Report for Application No. PCTUS2004005968, mailed Aug. 30, 2004, 4 pages.

Written Opinion for Application No. PCTUS2004005968, mailed Aug. 26, 2004, 6 pages.

International Preliminary Report on Patentability for Application No. PCTUS2004005968, mailed Sep. 2, 2005, 7 pages.

* cited by examiner 4 antennas, 16 subcarriers, 2 groups, 1 layer s_ijk = the k-th precoded symbol in the j-th group of the i-th layer

APPARATUS AND ASSOCIATED METHODS TO INTRODUCE DIVERSITY IN A MULTICARRIER COMMUNICATION CHANNEL

CROSS-REFERENCE TO RELATED APPLICATION

The present application claims the benefit of U.S. Provisional Application Ser. No. 60/451,110 filed Feb. 27, 2003, entitled "RATE-ONE SPACE FREQUENCY BLOCK CODES WITH MAXIMUM DIVERSITY GAIN FOR MIMO-OFDM" by Shao, et al and commonly owned by the assignee of the present invention. The disclosure of which is expressly incorporated herein by reference for all purposes.

TECHNICAL FIELD

Embodiments of the present invention are generally directed to wireless communication systems and, more particularly, to an apparatus and associated methods to introduce diversity in a multicarrier wireless communication system.

BACKGROUND

A multicarrier communication system such as, e.g., Orthogonal Frequency Division Multiplexing (OFDM), Discrete Multi-tone (DMT) and the like, is typically characterized by a frequency band associated with a communication channel being divided into a number of smaller sub-bands (subcarriers herein). Communication of information (e.g., data, audio, video, etc.) between stations in a multicarrier communication system is performed by dividing the informational content into multiple pieces (e.g., symbols), and then transmitting the pieces in parallel via a number of the separate subcarriers. When the symbol period transmitted through a subcarrier is longer than a maximum multipath delay in the channel, the effect of intersymbol interference between the subcarriers may be significantly reduced.

By simultaneously transmitting content through a number of subcarriers within the channel, multicarrier communication systems offer much promise for high-throughput wireless applications such as, e.g., wireless personal area network, local area network, metropolitan area network, fixed broadband wireless access, and the like. Each of these networking environments present their own challenges and, as such, a system designed to operate in one environment may not be suitable for other environments.

In broadband wireless access (BWA) networks (e.g., those described in the IEEE 802.16a standard, referred to below), deep fades may occur that can persist over a significant period of time. Further, such wide-area wireless channels encounter significant dispersion due to multipath propagation that limits the maximum achievable rates. Since BWA is intended to compete with cable modems and xDSL where the channel is static and non-fading, such system designs must counteract these key challenges and provide high data-rate access at almost wireline quality. To date, conventional techniques such as space-time block encoding, etc. fail to sustain the coding rate while providing the diversity gain as the number of transmit antenna increase past two (2). In this regard, such conventional techniques for providing broadband wireless access typically have to trade data rate (or, throughput) for received channel quality.

BRIEF DESCRIPTION OF THE DRAWINGS

Embodiments of the present invention are illustrated by way of example, and not by way of limitation, in the figures of the accompanying drawings in which like reference numerals refer to similar elements and in which.

DETAILED DESCRIPTION

Embodiments of an apparatus and associated methods to introduce diversity into a multicarrier wireless communication channel are generally presented. More particularly, according to an example embodiment, a diversity agent (DA) is introduced that utilizes an innovative coding scheme to improve diversity gain in a MIMO-OFDM system over frequency-selective channels, while also providing improved space-multipath diversity without rate loss. As will be developed more fully below, the diversity agent employs an innovative rate-one space-frequency encoding mechanism that is extensible to any number of transmit antennas, and does not require that the channel be constant over multiple OFDM symbols.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Example Network Environment

Figure 1:
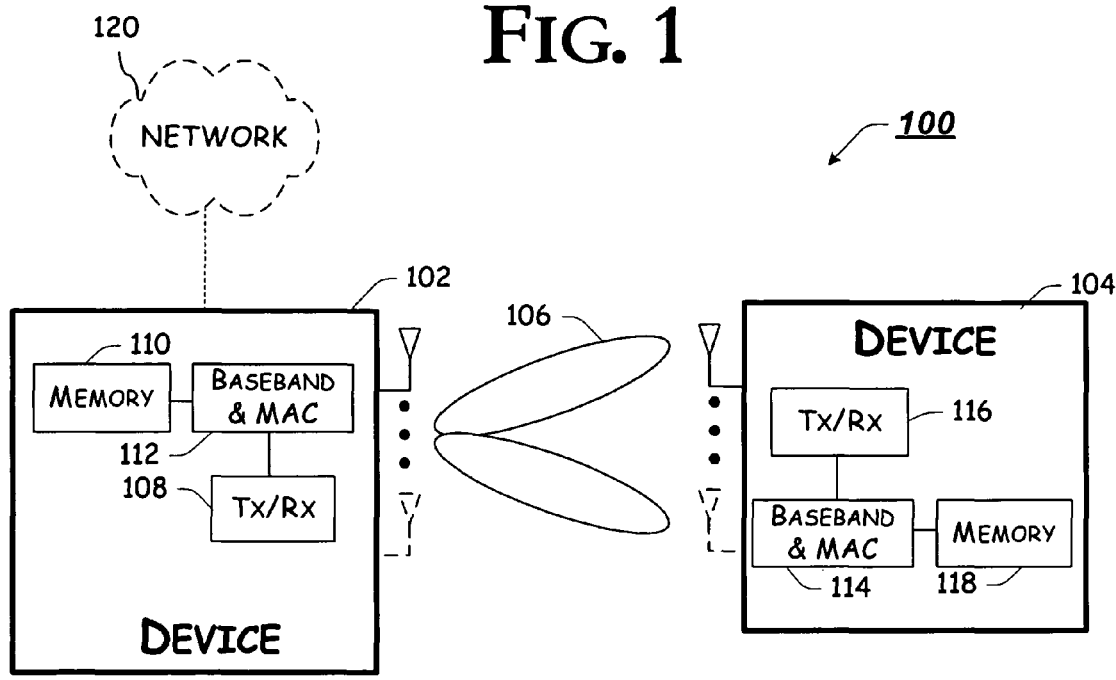
FIG. 1 is a block diagram of an example multicarrier wireless network incorporating the teachings of the present invention, according to one example implementation.

FIG. 1 illustrates a block diagram of a wireless communication environment within which the teachings of the present invention may be practiced. As shown, network 100 depicts two devices 102, 104, each comprising one or more wireless transmitter(s) and receiver(s) (cumulatively, a transceiver) 108, 116, baseband and media access control (MAC) processing capability 112, 114, and memory 110, 118, each coupled as shown. As used herein, the devices 102, 104 communicate information between one another via a multicarrier wireless communication channel 106 established between the transceiver(s) 108, 116 through one or more antenna(e) associated with the devices. According to one embodiment, one of the devices 102 may be coupled to another network 120, e.g., through one or more of a wireless and/or wireline communication medium. In this regard, embodiments of the invention may well be implemented by a service provider to provide "last mile" BWA access to one or more end-users in support of other value added services, e.g., voice-over-IP (VoIP), internet access, bill-paying services, voice mail services, and the like.

According to one example embodiment, one or more of the device(s) 102, 104 may utilize a novel diversity agent that employs an innovative rate-one space frequency encoding mechanism described herein. As used herein, the diversity agent may work with(in) a multicarrier transmitter to selectively map content (e.g., received from a host device, application, agent, etc.) to one or more antenna(e) and/or OFDM tones to generate a MIMO-OFDM communication channel 106.

According to one aspect of the invention, the diversity agent may include a novel rate-one space-frequency (SF) encoder suitable for use within a multicarrier communication system with M transmit antenna(e) and N receive antenna(e) to improve the channel diversity of frequency-selective channels. As developed more fully below, the rate-one SF code employed by the diversity agent may substantially achieve the maximum diversity gain attainable over frequency selective channels.

According to one aspect of the invention, the SF code symbol may only consume one multicarrier communication channel block duration and, as such, has a smaller processing delay than conventional multicarrier encoding techniques. Thus, for example, the SF code symbol may last for merely one OFDM block time. In this regard, the rate-one space-frequency encoder employed by diversity agent may well maximize channel diversity while preserving channel throughput in a frequency-selective multicarrier channel, making it well suited for the BWA network environment.

In addition to the foregoing, the diversity agent may selectively implement an innovative technique(s) for decoding information from a received OFDM channel processed as above, although the scope of the invention is not limited in this regard. Accordingly, a receive diversity agent is introduced which may include one or more of a combiner and a decoder to decode at least a subset of received signal elements encoded with the code construction described herein. According to one embodiment, the diversity agent may employ a maximum ratio combiner to receive a number of signal(s) and generate a signal vector. Diversity agent may also include a sphere decoder, coupled with the combiner, to decode the resultant signal vector received from the combiner element.

As used herein, baseband and MAC processing element(s) 112, 114 may be implemented in one or more processors (e.g., a baseband processor and an application processor), although the invention is not limited in this regard. As shown, the processor element(s) 112, 114 may couple to memory 110, 118, respectively, which may include volatile memory such as DRAM, non-volatile memory such as Flash memory, or alternatively may include other types of storage such as a hard disk drive, although the cope of the invention is not limited in this respect. Some portion or all of memory 110, 118 may well be disposed within the same package as the processor element(s) 112, 114, or may be disposed on an integrated circuit or some other medium external to element(s) 112, 114. According to one embodiment, baseband and MAC processing element(s) 112, 114 may implement at least a subset of the features of diversity agent described below, and/or may provide control over a diversity agent implemented within an associated transceiver (108, 116), although the invention is not limited in this regard.

While not specifically denoted in FIG. 1, the diversity agent may well be implemented in one or more of the baseband and MAC processing element(s) (112, 114) and/or the transceiver element(s) (108, 116), although the invention is not so limited. As used herein, but for the introduction of the diversity agent developed more fully below, devices 102, 104 are intended to represent any of a wide range of electronic devices with wireless communication capability including, for example, a laptop, palmtop or desktop computer, a cellular telephone (e.g., a 2G, 2.5G, 3G or 4G handset), a personal digital assistant, an WLAN access point (AP), a WLAN station (STA), and the like.

According to one embodiment, network 100 may represent a broadband wireless access (BWA) network wherein one or more of device(s) 102, 104 may establish a wireless communication channel in accordance with the specification of the Institute for Electrical and Electronics Engineers IEEE Std 802.16-2001 IEEE Std. 802.16-2001 IEEE Standard for Local and Metropolitan area networks Part 16: Air Interface for Fixed Broadband Wireless Access Systems, and its progeny including, e.g., IEEE Std 802.16a-2003 (Amendment to IEEE Std 802.16-2001), although the invention is not limited in this regard.

As used herein, network 120 is intended to represent any of a broad range of communication networks including, for example a plain-old telephone system (POTS) communication network, a local area network (LAN), metropolitan area network (MAA), wide-area network (WAN), global area network (Internet), cellular network, and the like. According to one example implementation, device 102 represents an access point (AP), while device 104 represents a station (STA), each of which suitable for use within an IEEE 802.11n wireless local area network (WLAN), and each utilizing the innovative space-frequency interleaving and transmit diversity techniques introduced above, and developed more fully below.

Example Architecture(s)

Figure 2:
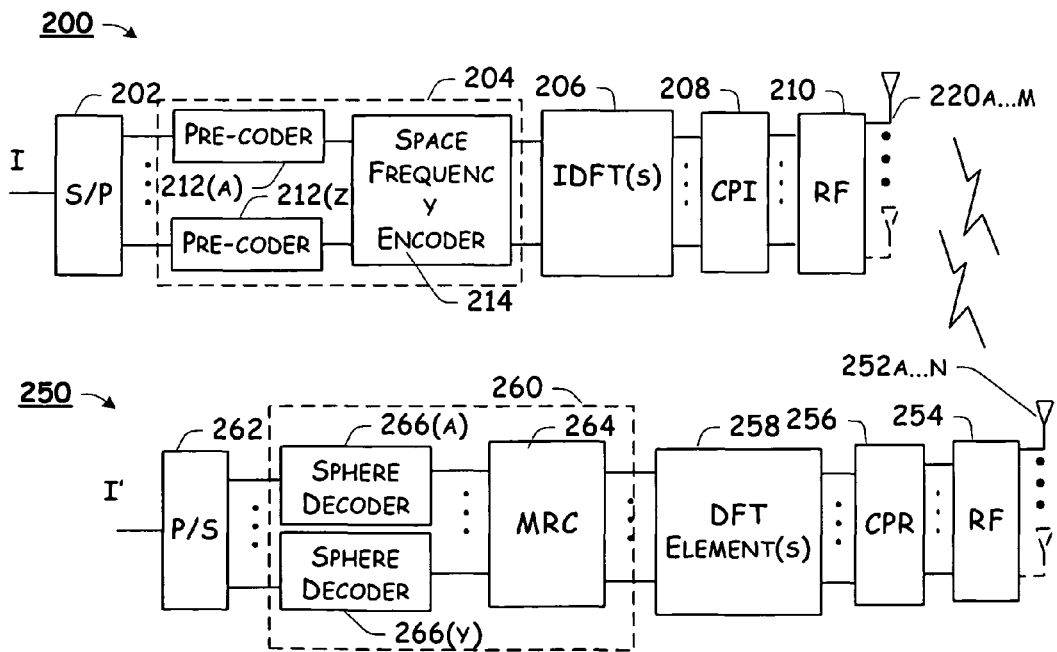
FIG. 2 is a block diagram of an example transceiver architecture incorporating the teachings of the present invention, according to one example implementation.

Turning to FIG. 2, a block diagram of an example transmitter architecture and an example receiver architecture are presented according to embodiments of the invention. To illustrate these architectures within the context of a communication channel between two devices, a transmitter from one device (e.g., 102) and a receiver from another device (e.g., 104) associated with a communication link are depicted. Those skilled in the art will appreciate that a transceiver in either device (102, 104) may well comprise the transmitter architecture and/or the receiver architecture as detailed in FIG. 2, although the scope of the invention is not limited in this regard. It should be appreciated that transmitter and receiver architectures of greater or lesser complexity that nonetheless implement the innovative transmit diversity and/or space-frequency interleaving described herein are anticipated by the scope and spirit of the claimed invention.

According to the example embodiment of FIG. 2, transmitter 200 is depicted comprising serial-to-parallel converter(s) 202, diversity agent 204 incorporating elements of an embodiment of the invention, inverse discrete Fourier transform element(s) 206, cyclical prefix, or guard interval, insertion element(s) 208, radio frequency (RF) processing element(s) 210 and two or more antenna(e) 220A . . . M, each coupled as depicted. According to one embodiment, transmitter architecture 200 may be implemented within transceiver 108 and/or 116. Although depicted as a number of separate functional elements, those skilled in the art will appreciate that one or more elements of transmitter architecture 200 may well be combined into a multi-functional element, and conversely functional elements may be split into multiple functional elements without deviating from the invention.

As used herein, serial-to-parallel (S/P) transform 202 may receive information (e.g., bits, bytes, frames, symbols, etc.)

from a host device (or, an application executing thereon, e.g., email, audio, video, etc.) for processing and subsequent transmission via the communication channel. According to one embodiment, the received information is in the form of quadrature amplitude modulated (QAM) symbols (i.e., wherein each symbol represents two bits, $b_i$ and $b_j$). That is, according to one embodiment, the received content is modulated into symbols (e.g., QAM, BPSK, QPSK, 8-PSK, 16-PSK, 128-PSK, 256-PSK, and the like), and may be convolutionally encoded at a rate of one or more of e.g., ½, ⅔, ¾., ⅝, ⅞, 1, 4/3 and the like. According to an alternate embodiment, one or more of the bit mapping (modulation) and convolutional encoding may well be performed within transmitter 200, and may be performed by diversity agent 204. Unlike the conventional coding systems, where the coding rate must be reduced as the number of antenna(s) increase, the rate-one, space frequency block coding technique described herein has no such limitations.

According to one embodiment, the serial-to-parallel transform 202 may generate a number of parallel substreams of symbols, which are passed to one or more instances of diversity agent 204. Although depicted as a separate functional element, serial to parallel transform 202 may well be included within embodiments of diversity agent 204, or another element of the transmitter 200.

Diversity agent 204 is depicted comprising one or more of a pre-coder 212A ... Z and a space frequency encoder(s) 214, each coupled as depicted according to an example embodiment, although the invention is not limited in this regard. According to one embodiment, the pre-coder functionality may well be integrated within the space-frequency encoder 214. In this regard, diversity agent(s) 204 of greater or lesser complexity that nonetheless generates a space-frequency matrix of encoded symbols are anticipated by the disclosure herein.

As developed more fully below, diversity agent 204 generates an M×Nc space-frequency matrix, where M is the number of transmit antenna(e) and Nc is the number of subcarriers of the multicarrier communication channel, using a rate-one space-frequency coding mechanism described more fully below with reference to FIG. 3. It will be appreciated that the rate-one space-frequency code applied to content received by diversity agent 204 may substantially achieve the maximum diversity attainable over frequency-selective channels. Moreover, since the code is transmitted in one OFDM block duration, it has smaller processing delay than conventional encoding mechanisms (e.g., space-time-frequency (STF) block codes).

The space-frequency encoded content is passed from diversity agent 204 to one or more inverse discrete Fourier transform element(s) 206, which transforms the content from the frequency domain into the time domain. According to one embodiment, the IDFT(s) 206 may be inverse fast Fourier transform (IFFT) element(s), although the invention is not limited in this regard. According to one embodiment, the number of IDFT elements 206 may be commensurate with the number of transmit antenna(e) (M), e.g., the number transmit radio frequency (RF) chains.

The time domain content from the IDFT element(s) 206 may be passed to CPI element(s) 208, which may introduce a cyclical prefix, or a guard interval in the signal(s), before it is passed to a radio frequency (RF) front-end 210 for, e.g., amplification and/or filtering prior to subsequent transmission via an associated one or more antenna(e) 220A ... M. Thus, an embodiment of multicarrier communication channel 106 is generated, according to one example embodiment of the present invention.

To extract content processed by a remote transmitter (e.g., 200), an example receiver architecture 250 is introduced. According to one example embodiment, receiver 250 is depicted comprising one or more of a radio frequency (RF) front end 254, cyclic prefix (or, guard interval) removal element(s) 256, discrete Fourier transform element(s) 258, receive diversity agent 260 according to embodiments of the invention, and parallel-to-serial transform element(s) 262, each coupled as depicted to generate a representation (I') of the originally transmitted information.

As shown, an RF front-end 254 receives a plurality of signals impinging on one or more receive antennae 252A ... N. According to one embodiment, each receive antenna has a dedicated receive chain, where the number of receive front-end elements 254, CPR elements 256 and FFT elements are commensurate with the number (N) of receive antenna(e) (e.g., N).

The RF front end 254 may pass at least a subset of the received signal(s) to a cyclic prefix removal element(s) 256, although the invention is not limited in this regard. According to one embodiment, CPR 256 removes any cyclic prefix or guard interval that may have been introduced during transmit processing of the received signal(s).

The content from CPR 256 is then provided to an associated one or more of discrete Fourier transform (DFT) element(s) 258. According to one embodiment, DFT elements 258 may employ a fast Fourier transform to the received signals to convert the received signals from a time domain to the frequency domain. Thus, a plurality of frequency domain representations of the received signal(s) are presented to receive diversity agent 260.

According to one aspect of the present invention, receive diversity agent 260 is presented comprising a combiner element 264 coupled to one or more decoder element(s) 266A ... Z. As developed more fully in FIG. 3, diversity agent 260 may receive one or more signal vectors at a maximal ratio combiner (264). The maximal ratio combiner 264 may phase align the various signal vectors, apply appropriate weighting measures and sum at least a subset of the various vectors. The output vector(s) are then applied to one or more sphere decoder(s) 266A ... Y.

As used herein, any of a number of sphere decoder's may well be used as the sphere decoder(s) 266A ... Y. According to one embodiment, described more fully below, the sphere decoder searches for the closest point among lattice points within a sphere of given radius centered at the receive point. For example, in the case of a QAM constellation, the sphere decoder may traverse the part of a lattice inside of a sphere (of sufficient radius) to identify signal vectors, and then filter out any vectors that are too far away from the received point, although the scope of the invention is not limited in this regard.

Once decoded, a number (Y) of parallel substreams of the decoded channel are provided to parallel-to-serial transform element(s) 262, which generate a serial representation (I') of the originally processed informational content (I).

Example Code Construction and Diversity Agent Operation

Figure 3:
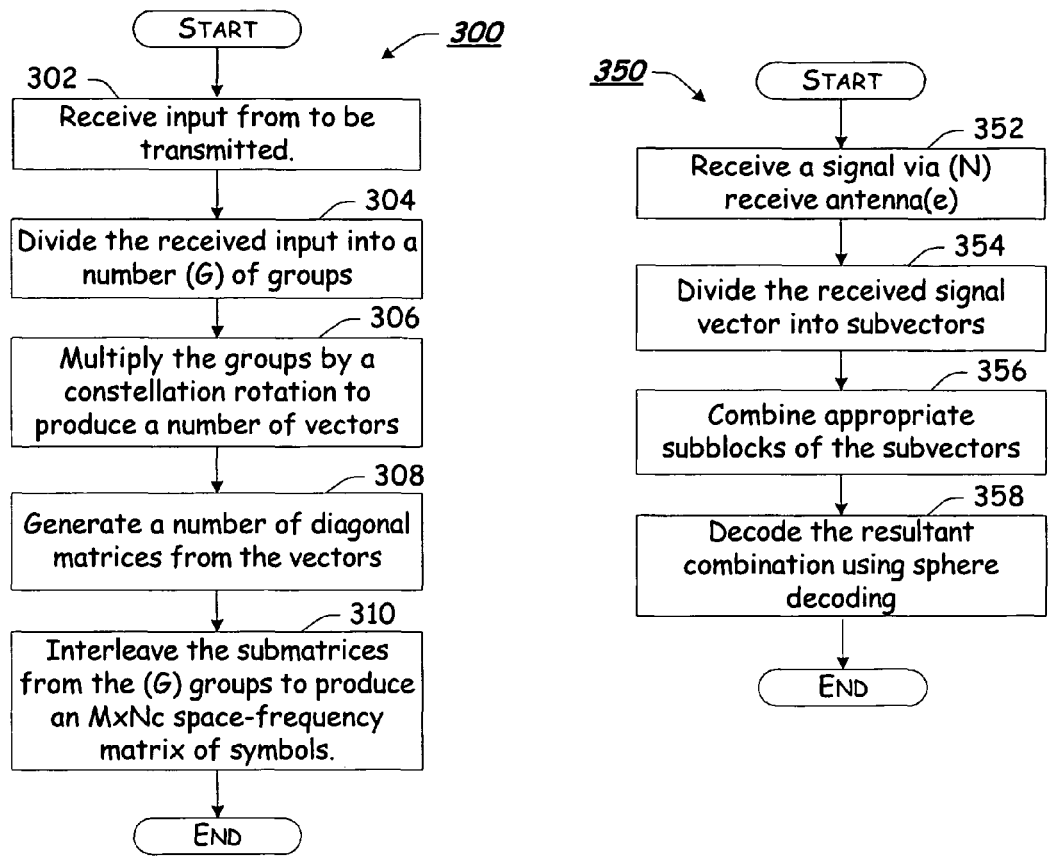
FIG. 3 is a flow chart illustrating a method for encoding/decoding content, according to one example embodiment of the invention.

Turning to FIG. 3, a flow chart of an example method of diversity agent operation to improve the diversity gain within a communication channel, while maintaining coding rate and channel throughput is generally presented, according to embodiments of the invention. For ease of discussion, and not limitation, the brief introduction to the design criteria and code construction is provided as an introduction to the operation of the diversity agent.

Code Design Criteria

According to one example embodiment, the rate-one, space-frequency code employed herein contemplate use within a MIMO-OFDM system with M transmit and N receive antennas and Nc subcarriers, where Nc>>M,N, although the scope of the invention is not limited to such systems and is, indeed, extensible to any multicarrier communication system with any number of subcarriers, transmit antenna(e) and receive antenna(e). Let C and E be two different space-frequency code words represented by matrices of size M×Nc. Assuming that the MIMO channel consists of L (matrix) taps, an upper bound on the expected pairwise error probability (averaged over the, e.g., general Rayleigh fading channel realizations) was derived. For the special case of no spatial fading correlation and a uniform power delay profile, the upper bound can be expressed as:

$$P(C \to E) \leq \prod_{i=0}^{rank(S)-1} \left(1 + \lambda_i(S)\frac{\rho}{4}\right)^{-N} \quad (1)$$

where ρ is the average signal-to-noise ratio (SNR), $\lambda_i(S)$ is the i-th nonzero eigenvalue of S. $S=G(C,E)G^H(C,E)$ has dimension Nc×Nc where G(C,E) is the Nc×ML matrix $G(C,E)=[(C-E)^T D(C-E)^T \ldots D^{L-1}(C-E)^T]$ and $$D = \left\{e^{-j\frac{2\pi}{Nc}k}\right\}_{k=0}^{Nc-1}.$$

For Nc>ML, in order to achieve M N L-fold diversity, appropriate code design is necessary to ensure that not only the M×Nc error matrix (C−E) is of full rank over all distinct {C,E} pairs, but the stacked matrix G(C,E) enjoys full rank as well. Just such a code design is introduced below in the rate-one, space-frequency encoder employed by the diversity agent.

According to one embodiment, for rate-one space-frequency block codes, the number of information symbols mapped into the space-frequency code matrix may be equal to the number of subcarriers Nc. According to one example embodiment, Nc=M×L×G, where G is the number of groups the subcarriers are divided into (i.e., the number of groups of subcarriers) (see, e.g., FIG. 4).

Rate-one Space-frequency Encoding

With that introduction to the development of the rate-one space-frequency block code, we turn to FIG. 3 where the method of space frequency encoding 300 begins with block 302, wherein diversity agent 204 receives input (e.g., from a host device or application executing thereon), block 302. According to one embodiment, the diversity agent receives QAM symbols, although the invention is not limited in this regard.

According to one embodiment, the content is received by one or more pre-coders 212A . . . Z of diversity agent 204, which may begin the encoding process by dividing the received content into a number (G) of groups, block 304. According to one embodiment, the Nc×1 vector of input symbols $s=[s_0^T s_1^T \ldots s_{G-1}^T]^T$ is divided into G groups of size ML×1 vectors $\{s_G\}_{g=0}^{G-1}$, although the invention is not limited in this regard.

In block 306, at least a subset of the vector of input symbols, $s_g$ is multiplied by a constellation-rotation (CR) pre-coder (e.g., within pre-coder 212)Θ. According to one embodiment, the same constellation-rotation Θ is applied to each of the Nc×1 vector of input symbols $s_G$ by left-multiplying the vector by the constellation rotation, although the invention is not limited in this regard. According to one embodiment, the constellation rotation Θ is of dimension ML×ML to produce size ML-vector $v_g = \Theta s_g = [\Theta_1^T s_g, \ldots, \Theta_{ML}^T s_g]^T$, where $\Theta_i^T$ denotes the ith row of Θ.

In block 308, at least a subset of the vectors $v_g$ is divided into L, M×1 subvectors, which are used to generate an M×M diagonal matrix $D_{s_g,k} = \text{diag}\{\Theta_{M \times (k-1)+1}^T s_g, \ldots, \Theta_{M \times k}^T s_g\}$ for k=1 . . . L. According to one example embodiment, L submatrices are regarded to be in the same group.

Figure 4:
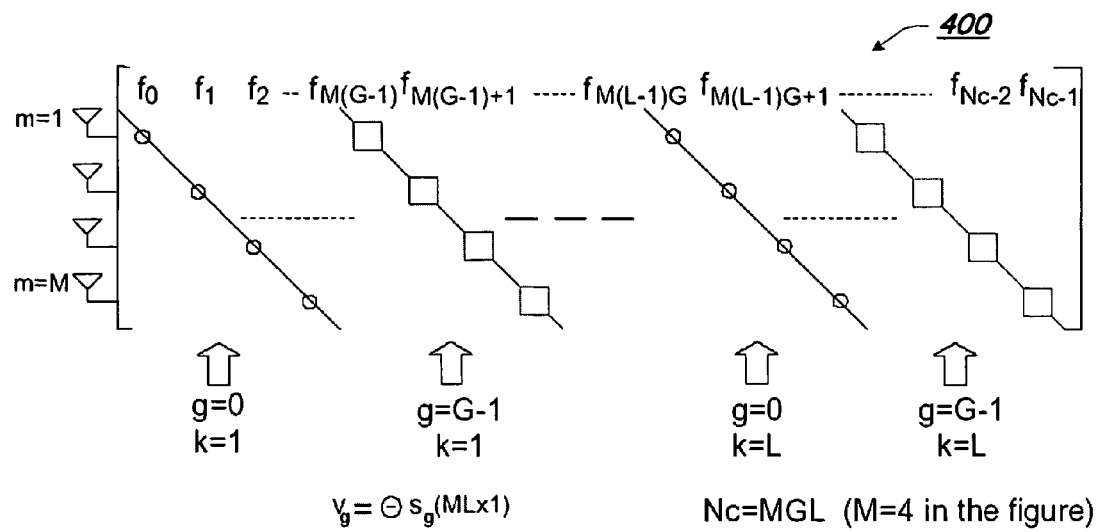
FIG. 4 is a graphical illustration of an example rate-one, space-frequency block code matrix, suitable for use in accordance with embodiments of the present invention.
Figure 4:
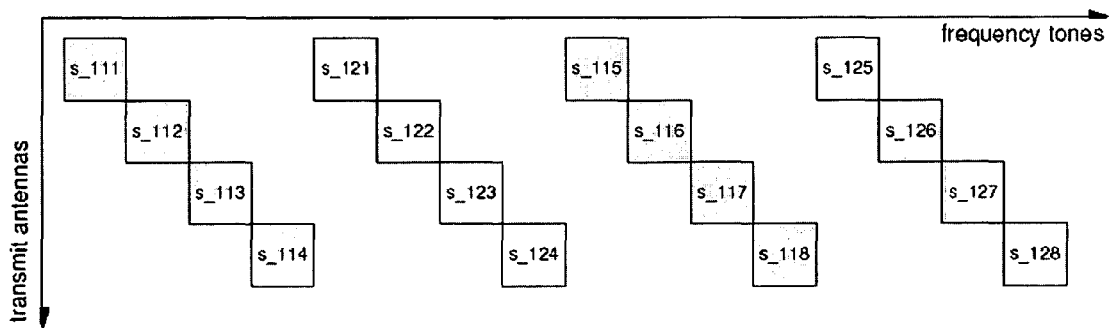

In block 310, the submatrices from the G groups (e.g., a total of G×L diagonal matrices) are interleaved to generate the M×Nc space-frequency matrix:

$$C = [D_{s_0}^{,1}, \ldots, D_{s_{G-1}}^{,1}, \ldots, D_{s_0}^{,L}, \ldots, D_{s_{G-1}}^{,L}] \quad (2)$$

as depicted in FIG. 4, where $\{f_i\}_{i=0}^{Nc-1}$ denote the Nc subcarriers. As a result, submatrices corresponding to successive symbols in the same group are equi-spaced in the codeword, C.

Those skilled in the art will appreciate that the rate-one, space-frequency designed described above possesses the property that successive symbols from the same group transmitted from the same antenna are at a frequency "distance" that is multiples of MG subcarrier spacings in order to exploit the diversity in frequency-selective channels. Accordingly, for known channel order and a uniform power delay profile, the channel frequency responses on subcarriers spaced at multiples of MG are uncorrelated. Therefore, the L symbols from the same group transmitted from the same antenna experience uncorrelated fading.

According to one embodiment, the rate-one, space-frequency encoder described above leverages the following desirable property of Θ: for all distinct pairs $\{s_g, \tilde{s}_g\}$ and $v_g = \Theta s_g$, and $\tilde{v}_g = \Theta \tilde{s}_g$, the corresponding error vector $e_g = (v_g - \tilde{v}_g)$ has substantially all nonzero elements. As a result, generating $D_{\tilde{s}_g,k}$ for k=1 . . . L from $\tilde{s}_g$, then the L diagonal matrices $(D_{s_g,k} - D_{\tilde{s}_g,k})$ have all diagonal elements that are non-zero. Accordingly, all distinct pairs $\{s_g, \tilde{s}_g\}$ give rise to L full-rank diagonal error matrices, which may be used to prove that the space-frequency codes proposed herein can achieve the maximum diversity gain of M N L. This proof is provided below.

Returning to FIG. 3, attention is directed to an example method 350 (on FIG. 3) of decoding content encoded using the rate-one, space-frequency encoding technique introduced above. According to one example embodiment, the decoding technique employed by diversity agent 260 begins with block 352 wherein diversity agent receives a number of signal vectors via the (N) receive processing chains. For ease of explanation, let $r^j$, $w^j$ denote the size Nc×1 received signal vector and noise vector at the jth receive antenna, respectively. According to one embodiment, $r^j$ is divided into LG size M×1 subvectors $\{r^{j,k,g}\}$ for g, k where the definition of g and k remain consistent with that introduced for the encoder, above. Similarly, $w^j$ can be divided into LG size M×1 subvectors $\{w^{j,k,g}\}$.

As above, $\Theta_i^T$ denotes the ith row of the constellation rotation matrix Θ, and $H_{i,l}^j$ denotes the channel frequency response of the ith transmit and the jth receive antenna pair at the lth tone. According to one embodiment, the diagonal matrix may be defined as:

$$\Lambda_{k,g}^j = diag \left\{ \begin{array}{c} H_{1,(k-1)GM+gM}^j \\ H_{2,(k-1)GM+gM+1}^j \\ \vdots \\ H_{M,(k-1)GM+(g+1)M-1}^j \end{array} \right\} \quad (3)$$

Accordingly, for the rate-one, space-frequency coding mechanism defined above, the received signal vector may be represented as:

$$r^j = [r^{j,1,0} r^{j,1,1} \ldots r^{j,L,G-2} r^{j,L,G-1}]^T \quad (4)$$
$$= [b^{j,1,0} b^{j,1,1} \ldots b^{j,L,G-2} b^{j,L,G-1}]^T +$$
$$[w^{j,1,0} w^{j,1,1} \ldots w^{j,L,G-2} w^{j,L,G-1}]^T$$

where $$b^{j,k,g} = \Lambda_{k,g}^j \begin{bmatrix} \Theta_{(k-1)M+1}^T \\ \Theta_{(k-1)M+2}^T \\ \vdots \\ \Theta_{kM}^T \end{bmatrix} s_g \quad (5)$$

and $r^{j,k,g} = b^{j,k,g} + w^{j,k,g}$.

In block 356, diversity agent combines appropriate subblocks of the subvectors. According to one embodiment, combining the sub-blocks of the gth group, we get:

$$r^{j,g} = [r^{j,1,g} r^{j,2,g} \ldots r^{j,L,g}]^T \quad (6)$$

$$= \underbrace{\begin{bmatrix} \Lambda_{1,g}^j & & \\ & \ddots & \\ & & \Lambda_{L,g}^j \end{bmatrix}}_{\Lambda_g^j} \Theta s_g + w^{j,g}$$

According to one embodiment, combining the information from the gth group over the N receive antennas is performed using a maximal ratio combiner element(s) 264, which yields:

$$y_g = \underbrace{\left( \sum (\Lambda_g^j)^H \Lambda_g^j \right)^{-1/2}}_{\Sigma_g} \times [(\Lambda_g^1)^H \ldots (\Lambda_g^N)^H] r_g \quad (7)$$

$$= \Sigma_g^{1/2} \Theta s_g + \eta_g \quad (8)$$

In block 358, diversity agent may use a maximal likelihood (ML) decoding technique of order 2×L×M to decode $s_g$ from $y_g$, although the invention is not limited in this regard. According to one example implementation, introduced above, one or more sphere decoder element(s) 266A ... Y may well be employed in this regard.

Accordingly, example encoding and decoding techniques to implement the rate-one, space-frequency code introduced herein have been described. It can be shown by the proof (provided below) that the rate-one space-frequency block codes proposed herein can achieve the maximum diversity gain of M N L.

Before delving into the supporting proof, attention is now directed to FIG. 4, which provides a graphical representation of the structure of a rate-one, space-frequency code matrix C, according to but one example embodiment of the invention. With reference to FIG. 4, matrix 400 depicts the general case of M antennae, G subcarrier groups, and L matrix channel taps. Matrix 420 depicts an example implementation with four (4) transmit antenna (M), 16 subcarriers (L) split into two groups. As shown, the notation in the blocks (s_i,j,k) represent the kth precoded symbol (s) in the jth group of the ith layer.

Figure 5:
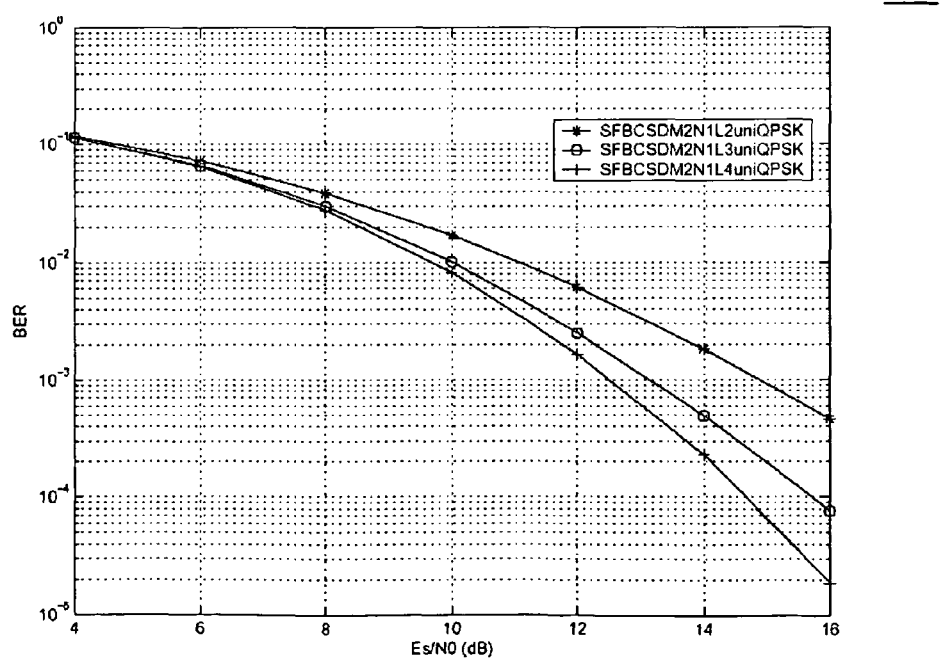
FIGS. 5, 6 and 7 provide graphical illustration depicting the performance advantage of embodiments of the present invention against conventional channel coding techniques, according to embodiments of the invention.
Figure 6:
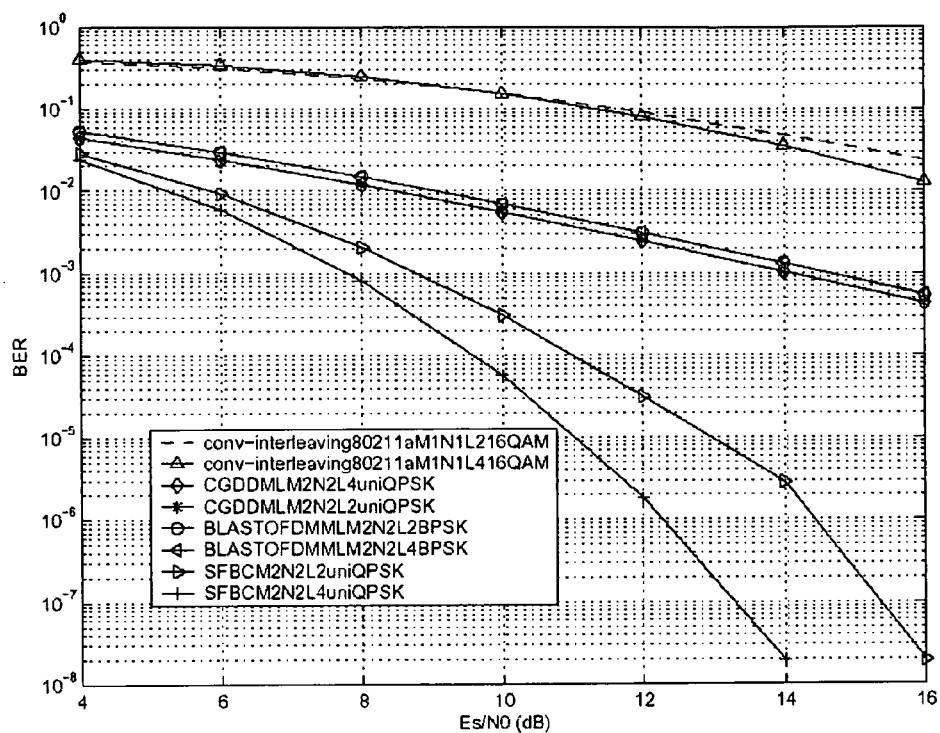
Figure 7:
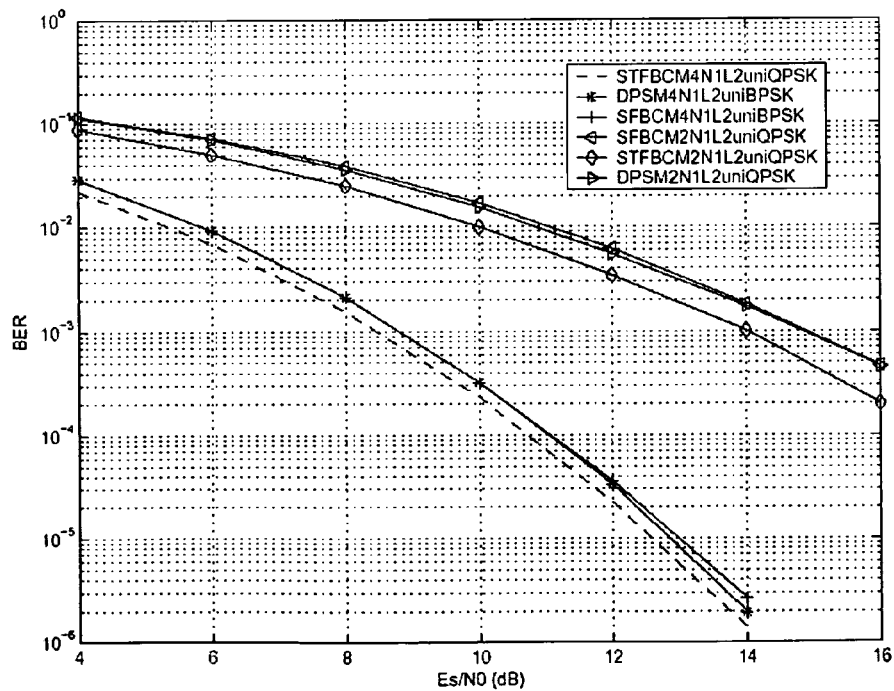

Turning to FIGS. 5-7, graphical representations of various performance comparison's are provided, according to one example embodiment, each of which will be addressed in turn. According to one embodiment, for purposes of these simulations, an OFDM system conforming to the 802.16.3 standard was used with FFT size of 256. Modulation symbols used were BPSK, 4QAM (or, 16QAM) where the total average symbol energy on M transmit antennas $E_s$=1.

In FIG. 5, a graphical illustration of throughput quality (e.g., quantified as a bit error rate (BER)) mapped against an signal-to-noise ratio (Es/No) for a number of system models with 2 transmit antenna, 1 receive antenna and different channel taps (L=2, 3, 4). In particular, FIG. 5 depicts that the more channel taps, the better the BER performance as the Es/No figure increases.

In FIG. 6, a graphical illustration of an example performance comparison between the proposed rate-one, space-frequency encoding technique and a number of conventional techniques. Of particular interest is that the space-frequency coding scheme introduced herein provides the best performance, and the only one that achieves M N L diversity gain.

In FIG. 7, a graphical illustration of an example performance comparison between the space-frequency block code and another conventional technique (space-time-frequency coding). As shown, the rate-one space-frequency coding technique described herein performs on par with the STF coding technique, while enjoying reduced complexity in the transmitter and the receiver.

Proof: Rate-one, Space-frequency Coding Mechanism Provides M N L Diversity Gain

From the equation (1) defining the upper bound on the expected pairwise error probability for the BWA communication environment, proving the diversity gain is substantially equivalent to proving that rank(S)=M L. Since S=G(C,E)G$^H$(C,E) and rank(S)=rank(G(C,E)) is equivalent to rank(G(C,E)$^T$), it suffices to show that rank(G(C,E)$^T$)=M L, where G(C,E)$^T$ is a ML×Nc matrix:

$$G(C,E)^T = \begin{vmatrix} (C-E) \\ (C-E)D \\ \vdots \\ (C-E)D^{L-1} \end{vmatrix} \quad (9)$$

and $$D = diag \left\{ e^{-j\frac{2\pi}{Nc}k} \right\}_{k=0}^{Nc-1}.$$

For the proof, it is assumed that the number of taps (L) is known.

Consider the Nc×1 vectors $s=[s_0^T s_1^T \ldots s_{G-1}^T]^T$, and $\tilde{s}=[\tilde{s}_0^T \tilde{s}_1^T \ldots \tilde{s}_{G-1}^T]^T$ and that $s \neq \tilde{s}$ for some g that is an element of {0, ..., G-1}. Without loss of generality, let $s_0 \neq \tilde{s}_0$.

Define the diagonal M×M matrix $A_{(k-1)G+g+1} = D_{s_g,k} - D_{\tilde{s}_g,k}$ for k=1, ..., L and g=0, ..., G-1.

Thus, C−E=[A₁ ... A_{GL}]. On the other hand, we can divide the diagonal matrix $$D = diag\left\{e^{-j\frac{2\pi}{Nc}k}\right\}_{k=0}^{GL}$$

into GL M×M diagonal sub-matrices $\{D_i\}_{i=1}^{GL}$.

As a result, it can be shown:

$$(C - E)D^i = [A_1 \ldots A_{GL}]\begin{bmatrix} D_1^i & 0 & \ldots \\ 0 & \ddots & 0 \\ 0 & \ldots & D_{GL}^i \end{bmatrix} \quad (10)$$

$$= [D_1^i \ldots D_{GL}^i]\begin{bmatrix} A_1 & 0 & \ldots \\ 0 & \ddots & 0 \\ 0 & \ldots & A_{GL} \end{bmatrix}$$

since both $A_j$ and $D_j^i$ are diagonal matrices. Therefore we can show:

$$G(C, E)^T = \begin{bmatrix} I_M & I_M & \ldots & I_M \\ D_1 & D_2 & \ldots & D_{GL} \\ \vdots & \vdots & \vdots & \vdots \\ D_1^{L-1} & D_2^{L-1} & \ldots & D_{GL}^{L-1} \end{bmatrix} \times \begin{bmatrix} A_1 & 0 & \ldots \\ 0 & \ddots & 0 \\ 0 & \ldots & A_{GL} \end{bmatrix} \quad (11)$$

As previously shown, over all distinct pairs $\{s_0, \tilde{s}_0\}$, we have L full rank diagonal error matrices $A_{(k-1)G+1} = (D_{s_0,k} - D_{\tilde{s}_0,k})$ for k=1, ... L. Thus, in $G(C,E)^T$, we can find a ML×ML submatrix that is the product of two other ML×ML matrices, as follows:

Accordingly, it may be shown that the product of the full rank block Vandermonde and full rank block diagonal matrix above has nonzero determinant and thus is of full rank ML. Since in $G(C,E)^T$ of ML×Nc, we can find a submatrix of dimension ML×ML which is of full rank, we conclude that rank(S)=rank($G(C,E)^T$)=ML is ensured, and the space-frequency codes proposed herein can achieve the maximum diversity gain of M N L.

Alternate Embodiment(s)

Figure 8:
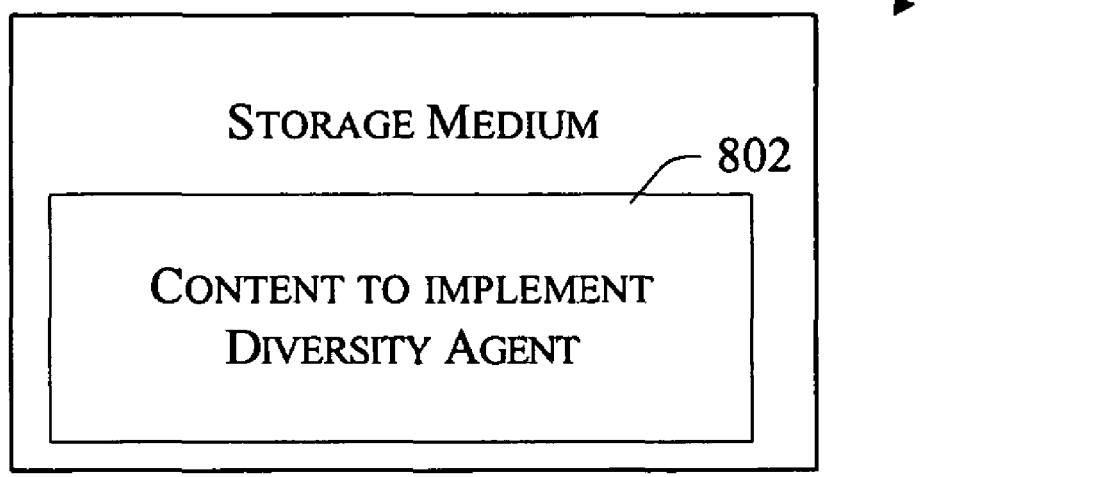
FIG. 8 is a block diagram of an example article of manufacture including content which, when executed by an accessing machine, causes the machine to implement one or more aspects of embodiment(s) of the invention.

FIG. 8 illustrates a block diagram of an example storage medium comprising content which, when invoked, may cause an accessing machine to implement one or more aspects of the diversity agent 204, 260 and/or associated methods 300. In this regard, storage medium 800 includes content 802 (e.g., instructions, data, or any combination thereof) which, when executed, causes an accessing appliance to implement one or more aspects of the diversity agent 204, 260 described above.

The machine-readable (storage) medium 800 may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem, radio or network connection). As used herein, all of such media is broadly considered storage media.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radiotelephone communication systems, satellite communication systems, two-way radio communication systems, one-way pagers, two-way pagers, personal communication systems (PCS), personal computers (PCs), personal digital assistants (PDAs), sensor networks, personal area networks (PANs) and the like, although the scope of the invention is not limited in this respect.

The types of wireless communication systems intended to be within the scope of the present invention include, although not limited to, Wireless Local Area Network (WLAN), Wireless Wide Area Network (WWAN), Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like, although the scope of the invention is not limited in this respect.

Embodiments of the present invention may also be included in integrated circuit blocks referred to as core memory, cache memory, or other types of memory that store electronic instructions to be executed by the microprocessor or store data that may be used in arithmetic operations. In general, an embodiment using multistage domino logic in accordance with the claimed subject matter may provide a benefit to microprocessors, and in particular, may be incorporated into an address decoder for a memory device. Note that the embodiments may be integrated into radio systems or hand-held portable devices, especially when devices depend on reduced power consumption. Thus, laptop computers, cellular radiotelephone communication systems, two-way radio communication systems, one-way pagers, two-way pagers, personal communication systems (PCS), personal digital assistants (PDA's), cameras and other products are intended to be included within the scope of the present invention.

The present invention includes various operations. The operations of the present invention may be performed by hardware components, such as those shown in FIGS. 1 and/or 2, or may be embodied in machine-executable content (e.g., instructions) 802, which may be used to cause a general-purpose or special-purpose processor or logic circuits programmed with the instructions to perform the operations. Alternatively, the operations may be performed by a combination of hardware and software. Moreover, although the invention has been described in the context of a computing appliance, those skilled in the art will appreciate that such functionality may well be embodied in any of number of alternate embodiments such as, for example, integrated within a communication appliance (e.g., a cellular telephone).

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Any number of variations of the inventive concept are anticipated within the scope and spirit of the present invention. In this regard, the particular illustrated example embodiments are not provided to limit the invention but merely to illustrate it. Thus, the scope of the present invention is not to be determined by the specific examples provided above but only by the plain language of the following claims.

What is claimed is:

1. A method comprising:
receiving content, at a diversity agent, the content for transmission from a wireless communication system having M transmit antennae and N receive antennae and Nc subcarriers, where Nc>>M,N, the received content for transmission from more than two of the M transmit antennae, wherein the received content is a vector of input symbols (s) of size Nc×1, and wherein the Nc subcarriers is the number of subcarriers of a multicarrier wireless communication channel of the wireless communication system;
generating a rate-one, space-frequency code matrix from the received content for transmission via the more than two of the M transmit antennae by dividing the vector of input symbols into a number G of groups to generate subgroups and multiplying at least a subset of the subgroups by a constellation rotation precoder to produce a number G of pre-coded vectors ($v_g$), wherein successive symbols from the same group transmitted from the same antenna are at a frequency distance that is multiples of MG subcarrier spacings;
wherein the diversity agent comprises an encoder to generate the rate one, space-frequency code matrix from the received content using a space frequency code; and
wherein the method further comprises the encoder applying the space frequency code to the received content to generate the rate-one, space-frequency code matrix, wherein the space frequency code only consumes one multicarrier communication channel block duration.

2. A method according to claim 1, further comprising:
dividing each of the pre-coded vectors into a number of LM×1 subvectors; and
creating an M×M diagonal matrix $D_{s_g,k}$=diag$\{\Theta_{M\times(k-1)+1}^T s_g, \ldots, \Theta_{M\times k}^T s_g\}$, where k=1 ... L from the subvectors.

3. A method according to claim 2, further comprising: interleaving the L submatrices from the G groups to generate an M×Nc space-frequency matrix.

4. A method according to claim 3, wherein the space-frequency matrix provides M N L channel diversity, while preserving a code rate of 1 for any number of the transmit antennae M, receive antennae N and channel tap(s) L.

5. A method according to claim 1, wherein the space-frequency matrix provides M N L channel diversity, while preserving a code rate of 1 for any number of the transmit antennae M, receive antennae N and channel tap(s) L.

6. The method of claim 1, further comprising:
transmitting the space frequency code in one OFDM block duration.

7. An apparatus comprising:
a diversity agent:
to receive content for transmission from a wireless communication system having M transmit antennae and N receive antennae and Nc subcarriers, where Nc>>M, N, the received content for transmission via a multicarrier wireless communication channel of the wireless communication system, wherein the received content is a vector of input symbols (s) of size Nc×1, and wherein the Nc subcarriers is the number of subcarriers of the multicarrier wireless communication channel;
and
to generate a rate-one, space-frequency code matrix from the received content for transmission on the multicarrier wireless communication channel from more than two of the M transmit antennae by dividing the vector of input symbols into a number G of groups to generate subgroups and multiplying at least a subset of the subgroups by a constellation rotation precoder to produce a number G of pre-coded vectors ($v_g$), wherein successive symbols from the same group transmitted from the same antenna are at a frequency distance that is multiples of MG subcarrier spacings;
wherein the diversity agent comprises an encoder to generate the rate one, space-frequency code matrix from the received content using a space frequency code, and
wherein the method further comprises the encoder applying the space frequency code to the received content to generate the rate-one, space-frequency code matrix, wherein the space frequency code only consumes one multicarrier communication channel block duration.

8. An apparatus according to claim 7, the diversity agent further comprising:
the encoder embodying a space-frequency encoding element to, responsive to the pre-coder element, divide each of the pre-coded vectors into a number of LM×1 subvectors, and to create an M×M diagonal matrix $D_{s_g,k}$=diag$\{\Theta_{M\times(k-1)+1}^T s_g, \ldots, \Theta_{M\times k}^T s_g\}$, where k=1 ... L from the subvectors.

9. An apparatus according to claim 8, wherein the space-frequency encoding element interleaves the L submatrices from the G groups to generate an M×Nc space-frequency matrix.

10. An apparatus according to claim 9, wherein the space-frequency matrix provides M N L channel diversity, while preserving a code rate of 1 for any number of the transmit antennae M, receive antennae N and channel tap(s) L.

11. An apparatus according to claim 7, wherein the space-frequency matrix provides M N L channel diversity, while preserving a code rate of 1 for any number of the transmit antennae M, receive antennae N and channel tap(s) L.

12. A wireless communication system comprising:
a number M of omnidirectional antennas, wherein M comprises more than two omnidirectional antennas;
a number N of receive antennae;
a number Nc of subcarriers of a multicarrier wireless communication channel of the wireless communication system, where Nc>>M,N; and
a diversity agent:
to receive content for transmission via the multicarrier wireless communication channel, wherein the received content is a vector of input symbols (s) of size Nc×1, and
to generate a rate-one, space-frequency code matrix from the received content for transmission on the multicarrier wireless communication channel from at least a subset of the M omnidirectional antennas by dividing the vector of input symbols into a number G of groups to generate subgroups and multiplying at least a subset of the subgroups by a constellation rotation precoder to produce a number G of pre-coded vectors ($v_g$), wherein successive symbols from the same group transmitted from the same antenna are at a frequency distance that is multiples of MG subcarrier spacings;

wherein the diversity agent comprises an encoder to generate the rate one, space-frequency code matrix from the received content using a space frequency code; and wherein the method further comprises the encoder applying the space frequency code to the received content to generate the rate-one, space-frequency code matrix, wherein the space frequency code only consumes one multicarrier communication channel block duration.

13. A wireless communication system according to claim 12, the diversity agent further comprising:

the encoder embodying a space-frequency encoding element to, responsive to the pre-coder element, divide each of the pre-coded vectors into a number of LM×1 subvectors, and to create an M×M diagonal matrix $D_{s_g,k} = \text{diag}\{\Theta_{M\times(k-1)+1}^T s_g, \ldots, \Theta_{M\times k}^T s_g\}$, where $k=1\ldots L$ from the subvectors.

14. A wireless communication system according to claim 13, wherein the space-frequency encoding element interleaves the L submatrices from the G groups to generate an M×Nc space-frequency matrix.

15. A wireless communication system according to claim 14, wherein the space-frequency matrix provides M N L channel diversity, while preserving a code rate of 1 for any number of the omnidirectional antennas M, receive antennae N and channel tap(s) L.

16. A wireless communication system according to claim 12, wherein the space-frequency matrix provides M N L channel diversity, while preserving a code rate of 1 for any number of the omnidirectional antennas M, receive antennae N and channel tap(s) L.

17. A method comprising:

receiving content, at a diversity agent, the content for transmission from a wireless communication system having M transmit antennae and N receive antennae and Nc subcarriers, where Nc>>M,N, the received content for transmission from more than two of the M transmit antennae, wherein the received content is a vector of input symbols (s) of size Nc×1, and wherein the Nc subcarriers is the number of subcarriers of a multicarrier wireless communication channel of the wireless communication system;

generating a rate-one, space-frequency code matrix from the received content for transmission via the more than two of the M transmit antennae by dividing the vector of input symbols into a number G of groups to generate subgroups and multiplying at least a subset of the subgroups by a constellation rotation precoder to produce a number G of pre-coded vectors ($v_g$), wherein successive symbols from the same group transmitted from the same antenna are at a frequency distance that is multiples of MG subcarrier spacings;

passing the rate-one, space-frequency code matrix as encoded content from the diversity agent to one or more inverse discrete Fourier transform (IDFT) elements; and transforming the encoded content from frequency domain into time domain content.

18. The method of claim 17, wherein a quantity of the IDFT elements is commensurate with a quantity of the M transmit antennae.

19. The method of claim 18, further comprising:

passing the time domain content to one or more cyclical prefix insertion (CPI) elements to introduce a cyclical prefix or a guard interval prior to transmission via the M transmit antennae.

* * * * *